US008317955B2

(12) United States Patent
Hirtreiter et al.

(10) Patent No.: US 8,317,955 B2
(45) Date of Patent: Nov. 27, 2012

(54) METHOD FOR AUTOMATIC SETTING OF THE RIDER ROLL/GLUE APPLICATOR ROLL GAP ON A GLUE MACHINE

(75) Inventors: Charles M. Hirtreiter, Park Falls, WI (US); John R. Sofinowski, Jarrettsville, MD (US); James A. Cummings, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 148 days.

(21) Appl. No.: 12/785,814

(22) Filed: May 24, 2010

(65) Prior Publication Data

US 2011/0284146 A1 Nov. 24, 2011

(51) Int. Cl.
*B32B 41/00* (2006.01)

(52) U.S. Cl. ........................... 156/64; 156/210; 156/292

(58) Field of Classification Search .................... 156/64, 156/292, 360, 361, 470, 471, 472, 473, 210
See application file for complete search history.

(56) References Cited

U.S. PATENT DOCUMENTS

| | | | | |
|---|---|---|---|---|
| 3,864,185 | A * | 2/1975 | Johnson et al. | 156/208 |
| 4,565,334 | A * | 1/1986 | Ruhl | 242/413.3 |
| 4,806,183 | A * | 2/1989 | Williams | 156/64 |
| 5,581,353 | A | 12/1996 | Taylor | |
| 5,785,802 | A | 7/1998 | Seki et al. | |
| 5,876,530 | A | 3/1999 | Seki et al. | |
| 6,068,701 | A | 5/2000 | Kohler et al. | |
| 6,602,546 | B1 | 8/2003 | Kohler | |
| 6,620,455 | B2 | 9/2003 | Mensing et al. | |
| 2002/0046811 | A1 | 4/2002 | Mensing et al. | |
| 2004/0241328 | A1* | 12/2004 | Bradatsch et al. | 427/356 |
| 2008/0317940 | A1* | 12/2008 | Kohler | 427/8 |

OTHER PUBLICATIONS

International Search Report and Written Opinion dated Dec. 8, 2011.

* cited by examiner

*Primary Examiner* — George Koch
(74) *Attorney, Agent, or Firm* — Andrus, Sceales, Starke & Sawall, LLP

(57) ABSTRACT

A method for automatically setting the rider roll/glue applicator roll gap for the single face web on a glue machine senses a forward drag that the single face web, operating at corrugator speed, exerts on the glue applicator roll, driven at an underspeed, after bringing the flute tips of the single face web into contact with the glue applicator roll by adjusting the position of the rider roll. Changes in forward drag exerted on the glue applicator roll are monitored and related directly to glue applicator roll drive current to provide a slight compression of the single face web between the rider roll and the glue applicator roll. Preferably, the glue applicator roll uses a regenerative drive and the target drive current command in a feedback control system to cause the gap to be adjusted to achieve the desired slight compression of the web flutes and to maintain the glue applicator roll under speed.

9 Claims, 5 Drawing Sheets

METHOD FOR AUTOMATIC SETTING OF THE RIDER ROLL/GLUE APPLICATOR ROLL GAP ON A GLUE MACHINE

FIELD OF THE INVENTION

The present invention relates to the production of corrugated board and more particularly to a novel and improved method for controlling the application of an adhesive to the flute tips of singleface web in the corrugated board manufacturing process.

BACKGROUND OF THE INVENTION

In the production of corrugated board a multiplicity of grades of linerboard and medium are used as well as a variety of flute formations. This requires frequent adjustment of the glue machine to maintain quality production of corrugated board. The basic concept of the present invention allows the glue machine to adapt to this changeable environment of corrugated production automatically without operator intervention required after startup of the corrugator.

In the first step of corrugated board production, a machine called a singlefacer is used to flute a given grade of medium (paper) between a pair of corrugating rolls machined to a specified profile. This fluted medium is then bonded to a liner of various grades of paper using a starch based adhesive. After combining the medium and liner in this fashion, the resulting singleface web progresses to a bridge storage area where latent heat that has been applied to the medium and liner continue to cure the starch based adhesive securing the bond.

The next step in the corrugating process takes the singleface web produced at the singlefacer and combines it with another (bottom) liner. This bottom liner becomes the exterior surface of a corrugated container and is usually a finer grade of paper. This surface (the box exterior) will normally have flexographic printing applied in the process of creating a finished box. Alternatively, a preprinted liner can be used or a label can be affixed to the outer surface of the corrugated box blank to create the finished box. Bonding the second liner, known as the "doubleface" liner, requires an even application of adhesive onto the medium flute tips across the full width of the singleface web.

The application of adhesive to the singleface web flute tips occurs in a machine referred to as a glue machine. A primary feature of this machine is a glue applicator roll, which may have an engraved surface. A film of adhesive is picked up by the glue applicator roll as it rotates through a glue pan filled with starch based adhesive. The adhesive is metered onto the glue roll, typically using a contra rotating metering roll, so that a consistent glue film thickness is applied across the working width of the glue applicator roll surface. Other methods of metering are applicable, such as those defined in U.S. Pat. No. 6,068,701 dated May 30, 2000.

The glue applicator roll usually runs at a speed some small percentage less than the speed of the singleface web passing in contact with the roll, commonly 95%-98% of singleface web speed. The roll underspeed is crucial to achieve starch application centered on the flute tip allowing for proper bonding to the doubleface liner. Maintaining proper glue roll rotational speed is achieved through the use of a drive with a regenerative feature. This regenerative feature is critical to maintaining the proper speed ratio between the singleface web and glue applicator roll surface.

A glue machine can be equipped with a rider roll designed to bring the flute tips of the singleface web into intimate contact with the adhesive film on the glue applicator roll. The rider roll must be positioned to create an adjustable gap between it and the glue applicator roll through which the singleface web passes. This gap ensures the singleface web flute tips pick up the desired amount of adhesive. Improper setting of the rider roll to glue applicator roll gap can create two undesirable conditions. If the gap setting is too loose, areas along the flute tips may pick up too little starch or no starch at all. This will result in the formation of a blistered and undesirable exterior surface of the corrugated box. If the rider roll to glue roll gap is set too tight, the singleface web passing through this nip will be deformed and damaged. This compression of the board past its elastic range can result in a significant loss in the mechanical strength of the corrugated box deeming it unacceptable to its application. Significant singleface web compression also results in excessive starch application with several negative effects beyond the cost of the starch consumed. For example, excess starch application will cause wash boarding that is difficult to print on and that shows up as undesirable striated lines through a preprinted or labeled surface. Excessive starch application also results in increased energy consumption required to gel the starch and drive the moisture from the glue line.

Rider roll/glue applicator roll gap setting has been normally left to the operator on prior technology glue machines. This can lead to improper gap setting, particularly on corrugators that involve a lot of paper grade changes. It is desirable, therefore, to implement a means of automatic adjustment of the rider roll to glue applicator roll gap.

Automatic rider roll gap setting means have been described in the prior art. Several contact and non-contact means have been disclosed in the literature for direct measurement of singleface web caliper upstream of the glue machine for purposes of command positioning of the rider roll gap. U.S. Pat. No. 4,360,538 discloses, for example, a contact singleface web caliper sensing device that derives a signal that is used to adjust the rider roll gap setting to achieve a desirable compression of the singleface web between the rider roll and glue applicator roll. US Patent Publication 2008/0317940 A1 discloses several non-contact singleface web flute height sensing techniques that use a curtain of visible, infrared or ultraviolet light or laser beams. Any of these upstream flute height measurement techniques, when used in conjunction with a rider roll to glue applicator roll gap measurement, can be used for automatic setting of the desired gap. Also disclosed is a contact automatic singleface web caliper sensor as shown in FIG. 10 of the same publication. This means of sensing singleface web caliper will be discussed in more detail in ensuing paragraphs. All of these contact and non-contact methods for singleface web flute height measurement and subsequent rider roll gap setting add complexity and require absolute calibration of the singleface web flute height sensing means as well as the rider roll gap adjustment hardware that can drift out of tune with time creating a maintenance issue.

Concepts have been described in the literature for use of pressure loading of the rider roll to force the flutes of the singleface web into contact with the glue applicator roll. Means of actuation and sensing of pressure force, for example, are described in U.S. Pat. No. 6,620,455 B2. The pressure loading of the rider roll causes deflection of the singleface web flutes as clearly shown in FIG. 4 of US Patent Application Publication 2008/0317940 A1. There are several problems with the pressure loading concepts. First, the required pressure loading must be empirically determined based upon the strength of the flute tip. The flute tip strength varies considerably with type of flute formation as well as within a flute type as a function of the medium basis weight and even the manufacture of the medium. As a consequence it is difficult to select the desired pressure setting without getting too much or too little deflection of the flute tips. Too little deflection can cause poor starch adhesive transfer, and too much deflection can cause permanent crush to the flute tips causing degradation in the quality of the corrugated board manufactured. In addition, the means of sensing and controlling the pressure are complex and suffer from performance issues related to the bad environment of the glue machine. Starch adhesive is caustic and, as is well known in the art, splashes about the glue machine contaminating operating mechanisms and requiring frequent clean up. The contamination can affect the precision of the pressure loading mechanisms making them difficult to use in practice.

As a consequence, there is still a need in the art for an improved means of automatically controlling the rider roll to glue applicator roll gap to a precise setting to achieve sufficient and necessary adhesive transfer to the singleface web flute tips without compressing the flutes such that permanent damage occurs. Furthermore, it is desirable to achieve these objectives without unduly complex addition of mechanical mechanisms that require maintenance and frequent cleaning to keep them operating. In particular it is desirable to avoid requirement for periodic absolute calibration of measuring and controlling sensors to keep them functional and operable.

SUMMARY OF THE INVENTION

The essence of the present invention is a method for precise adjustment of the rider roll to glue applicator roll gap in a glue machine that involves recognizing that regenerative glue applicator roll drive current is reactive to compression of the singleface web within the gap. The glue applicator roll drive, under normal operating conditions, must provide a positive output current to achieve adequate torque out of the glue roll motor to overcome the inertial and frictional bearing drag loads on the glue applicator roll to keep it turning at some desired set point speed. Nominally, speed is set at a range of 95%-98% of operating corrugator speed. This underspeed is required to get proper transfer of starch adhesive onto the center of the flute tips of the singleface web. The rider roll compresses the singleface web against the glue applicator roll to insure transfer of starch adhesive onto the flute tips that are traveling at operating corrugator speed. The singleface web creates a frictional drag on the glue applicator roll proportional to the normal force of the flute tips as they are compressed by the rider roll and the coefficient of friction between the singleface web medium and the adhesive coated glue applicator roll. This frictional drag of the singleface web on the glue applicator roll adds torque on the roll so that less glue roll motor torque is required to maintain the speed of the roll. As more compressive force is added by reducing the rider roll gap, the drive on the glue applicator produces negative current causing the regenerative glue roll drive and motor to act as a brake to maintain the glue applicator roll at the 95%-98% underspeed.

In the preferred embodiment of the present invention, a target glue applicator drive current setting is entered by the operator on the glue machine interface touch screen and an appropriate feedback control loop adjusts the rider roll gap to achieve a variable singleface web compression that will cause the gap to be set where there is just a slight compression when the target current is achieved. The target current is based upon empirical understanding of the impact of singleface web drag on drive roll current output. Empirical data show that with no compression, the glue roll drive current will be some level as simply required to overcome inertia and frictional bearing drag of the roll. As singleface web compression is added, glue roll drive current will decrease. As compression is increased further, the glue roll drive current will go negative indicating the drive and motor are braking the glue applicator roll. Understanding of this singleface web compression/glue roll drive current relationship allows selection of a set point drive current that results in a very slight singleface web compression that allows desired starch adhesive transfer but no permanent flute tip deformation or damage. Experience has shown that target currents can be chosen that will result in singleface web compression of less than one percent. Studies indicate that there is no permanent deformation or damage to the flute tips on the singleface web until compression reaches the range of four to five percent.

A primary advantage of the present invention is that rider roll control is achieved with no additional mechanical hardware or mechanisms as are prevalent in prior art rider roll gap setting concepts. This ultimate simplicity means that there is no penalty related to clean up or maintenance to keep the automatic rider roll control concept of the present invention operational.

Yet another advantage of the present invention is that it can operate perfectly with no sensing of absolute value of gap or singleface web caliper as is prevalent and required by prior art technology. This means that periodic calibration of sensors is not required eliminating an operational reliability issue associated with prior art rider roll gap solutions.

It should be well understood by those skilled in the art that other embodiments of the preferred solution are possible and within the scope of this current invention. For example, the operator could enter a desired target compression of the singleface web and a suitable feedback control loop could adjust the rider roll gap to achieve variable drive current that will cause adjustment of the gap to achieve the drive current that will just yield the required compression. Additionally, the method of the present invention could include the use of any means for direct measurement of glue applicator roll motor output torque or any variable proportional to the torque for purposes of sensing and adapting to singleface web frictional drag force for purposes of controlling compression of the web between the rider roll and the glue applicator roll.

During start-up and other phases of corrugator operation involving acceleration, the glue applicator roll drive current reacts to the requirement to change the speed of the roll rather than to compression of the singleface web. According to the present invention, a filter on the drive current feedback senses the acceleration causing the gap to be latched at its current setting or an initial setting. At start-up, for example, the operator could enter the flute being run and a nominal gap setting would be selected based upon this flute type. This setting could be manually adjusted by the operator based upon his knowledge of the paper combination being run. After reaching a cruise speed, the automatic gap adjustment mode of the present invention would take over based upon settings in the drive current filter and adapt automatically to the caliper of the product being run as well as to ensuing paper changes.

Alternately, according to another aspect of the present invention, an optimal initial start-up gap setting solution would be based upon the feed forward of a singleface web caliper measured using a simple contact means. This singleface web caliper measurement would be calculated using the respective angular velocities of two idler rollers, one with the singleface web flutes down on the idler roll and the other with the singleface web wrapped such that the flutes faced outward away from the idler roll.

In yet another aspect of the present invention, this same means of measuring singleface web caliper could be used to reset the rider roll gap when a splice is made changing paper during a corrugator acceleration or deceleration phase when the rider roll gap setting would otherwise be latched. As soon as the splice enters the glue machine, as evidenced by a splice signal, the rider roll gap would adjust based upon the measured singleface web. Then, when the corrugator reached a quiescent (non-acceleration) period, the drive current feedback would be unlatched and any error associated with the gap setting based upon the sensed singleface web caliper would be corrected.

It should be noted that the automatic gap control using drive current feedback reacts very quickly to a change of paper caliper at a splice, normally adjusting the gap to the correct setting within less than a second. The use of upstream singleface web caliper is not a requirement for automatic gap control but a refinement that reduces operator workload.

U.S. Pat. No. 5,785,812 discloses the use of sensing of glue applicator roll speed change to set the gap between the glue applicator roll and the corrugating roll of the singlefacer. This glue application concept involves sensing of a glue applicator roll speed change wherein the flute tips of the medium are wrapped around the corrugating roll flute tips and the glue applicator roll is powered into direct contact with the corrugating roll. The glue applicator roll speed adjustment is affected thereby with hard contact between the corrugating roll and the glue applicator roll with the fluted medium caught in between simply acting like a slight cushion between the two hard bodies. A key difference between this disclosed method of glue applicator roll gap setting is that the method of the present invention uses drive current as a means of sensing torque on the roll as opposed to speed change of the roll. Further, it is a precept of the present invention that no speed change on the glue applicator roll is allowed to occur due to feedback control of drive current to avoid the speed change. Also, in the present invention, singleface flute compression affects the torque on the roll as opposed to the interference between two hard rollers.

BRIEF DESCRIPTION OF THE DRAWINGS

The foregoing and other aspects of the present invention will become apparent to those skilled in the art to which the present invention relates upon reading the following description with reference to the drawings below.

DETAILED DESCRIPTION OF THE INVENTION

Figure 1:
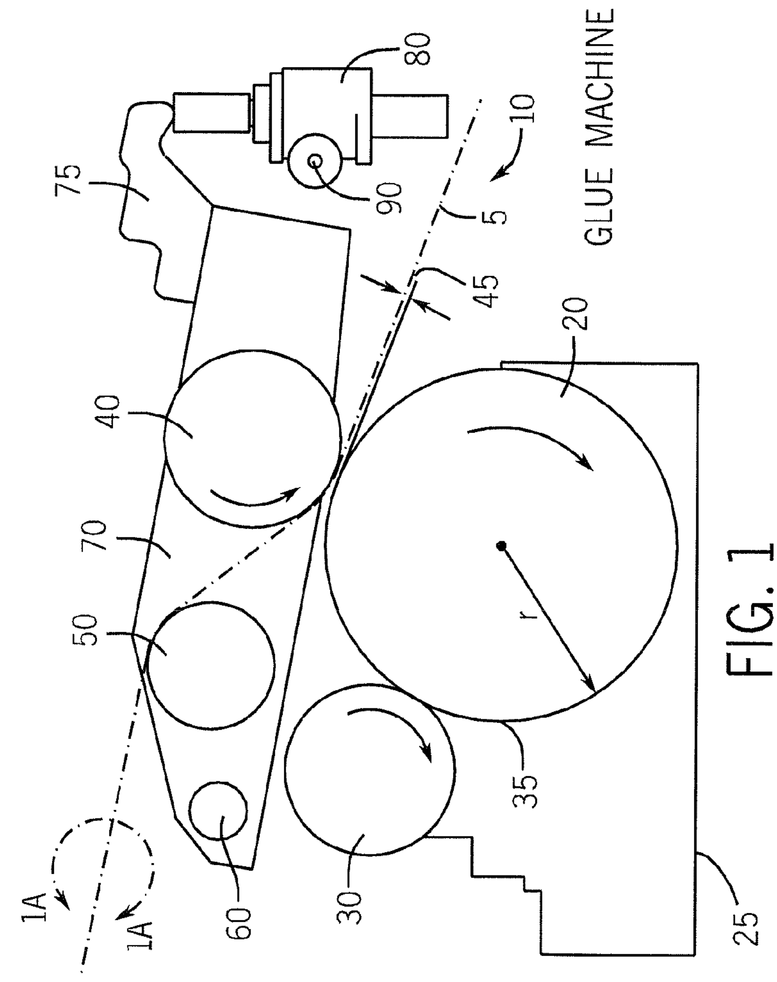
FIG. 1 is a sectional view showing a glue machine apparatus with glue applicator roll, metering roll, and rider roll.

Primary and essential elements of a corrugated glue machine are shown in FIG. 1. The glue applicator roll 20 runs in a glue pan 25 where it picks up a layer of adhesive 35 that is then metered by a contra-rotating metering roll 30. It is understood by those skilled in the art that there are other means of metering the glue applicator roll glue film, for example the metering concept disclosed in U.S. Pat. No. 6,068,701.

Figure 1A:
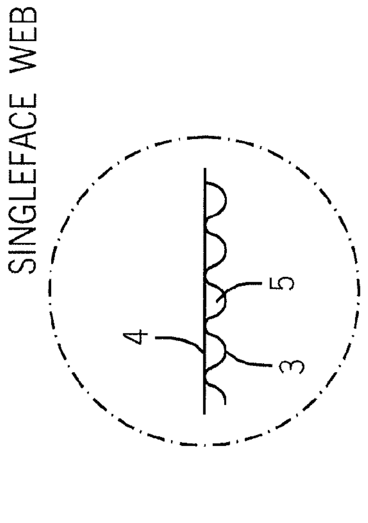
FIG. 1A is a detail of the singleface web shown in FIG. 1.

The singleface web 5 comprised of a top liner 4 and a fluted medium 3 (See FIG. 1A) that has been adhered to the top liner on upstream corrugated machinery enters the glue machine 10 around idler roll 50. Idler roll 50 is positioned such that the singleface web takes a curved wrap around rider roll 40. It is important to position the idler roll to get significant wrap so that individual flute tips of the fluted medium 3 just dip into the metered adhesive 35 as will be discussed in more detail in the description of ensuing figures.

Rider roll 40 is attached to side bars 70 that pivot about axis of rotation 60. The side bars are loaded pneumatically or by other suitable means forcing stop blocks 75 against screw jack positioners 80. There are screw jacks located on each side of the machine that are timed by timing rod 90 that is powered by screw jack actuators, not shown. The screw jack actuation system can be controlled to achieve a desired rider roll to glue applicator roll gap.

Figure 2:
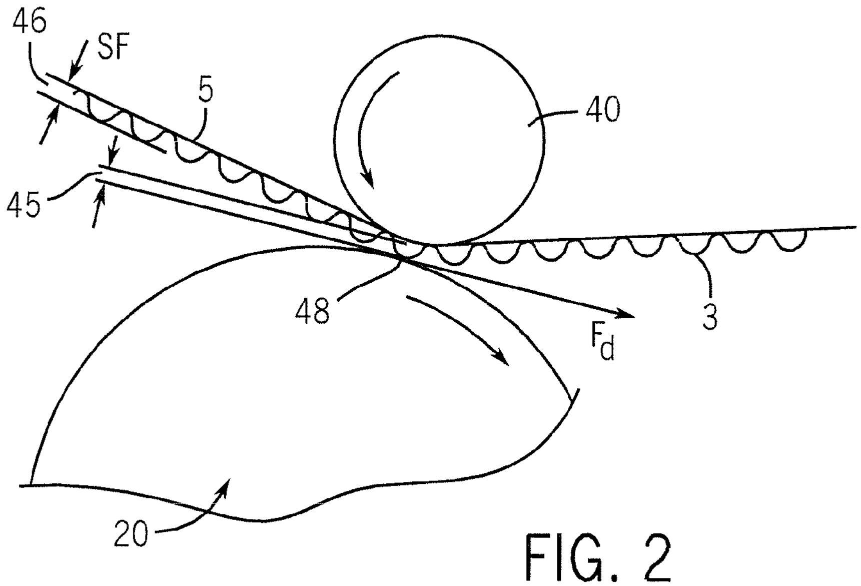
FIG. 2 is a sectional view of the glue machine, glue applicator roll, and rider roll with singleface web shown in the gap between these rolls.
Figure 3:
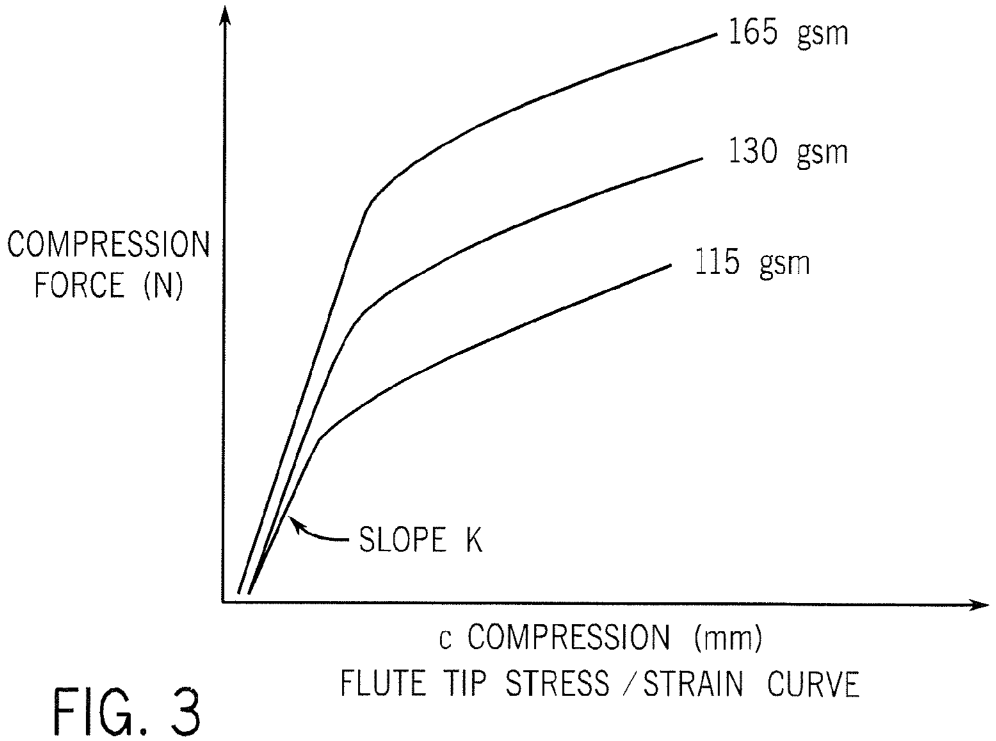
FIG. 3 is a plot of singleface web compression force versus compression of the medium flute tips.

FIG. 2 shows an expanded view of the rider roll 40, glue applicator roll 20, and singleface web 5. As the gap 45 between rider roll 40 and the glue applicator roll 20 begins to close on the singleface web 5, forcing the flute tips 3 into contact with the glue applicator roll 20, the flutes compress by a small amount. A plot of the singleface web flute compression c versus the compression normal force N is shown in FIG. 3. The singleface web 5 exerts a forward running drag force $F_d$ as a function of the compressive force N and the singleface flute tip to starch adhesive coated glue applicator coefficient of friction. The compressive force N is determined by the slope of the stress strain curves K in FIG. 3 and the singleface web compression c. The drag force on the glue applicator roll will vary slightly at low levels of flute compression as a function of medium basis weight as shown in FIG. 3. The stress strain curves tend to run together for small amounts of compression, which is the normal operating situation for the automatic rider roll gap system of the present invention. As a consequence, performance of the system does not depend, to a significant extent, on type of paper or basis weight of paper.

Figure 4:
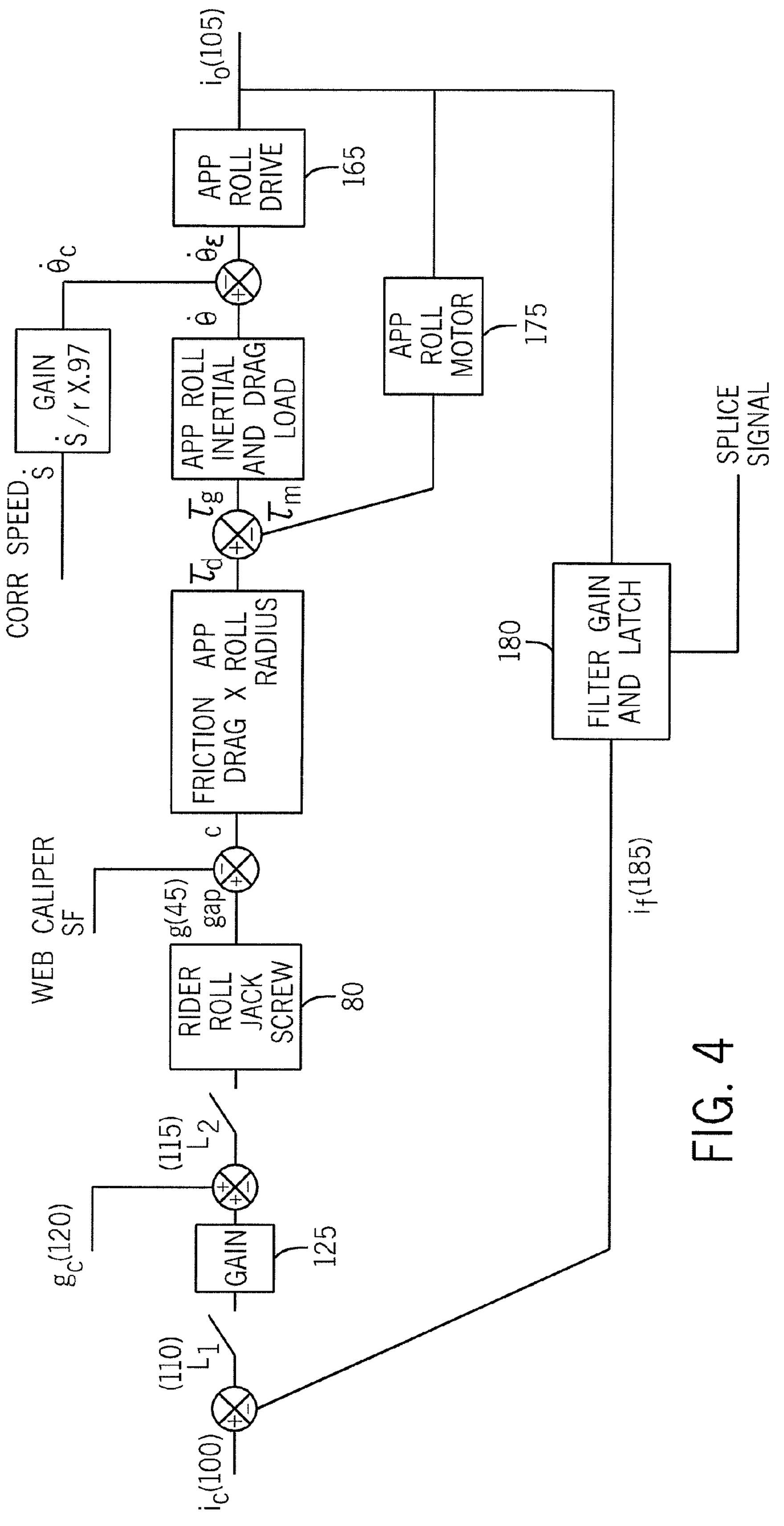
FIG. 4 is a feedback control system schematic representation of the rider roll gap setting system of the present invention.
Figure 7:
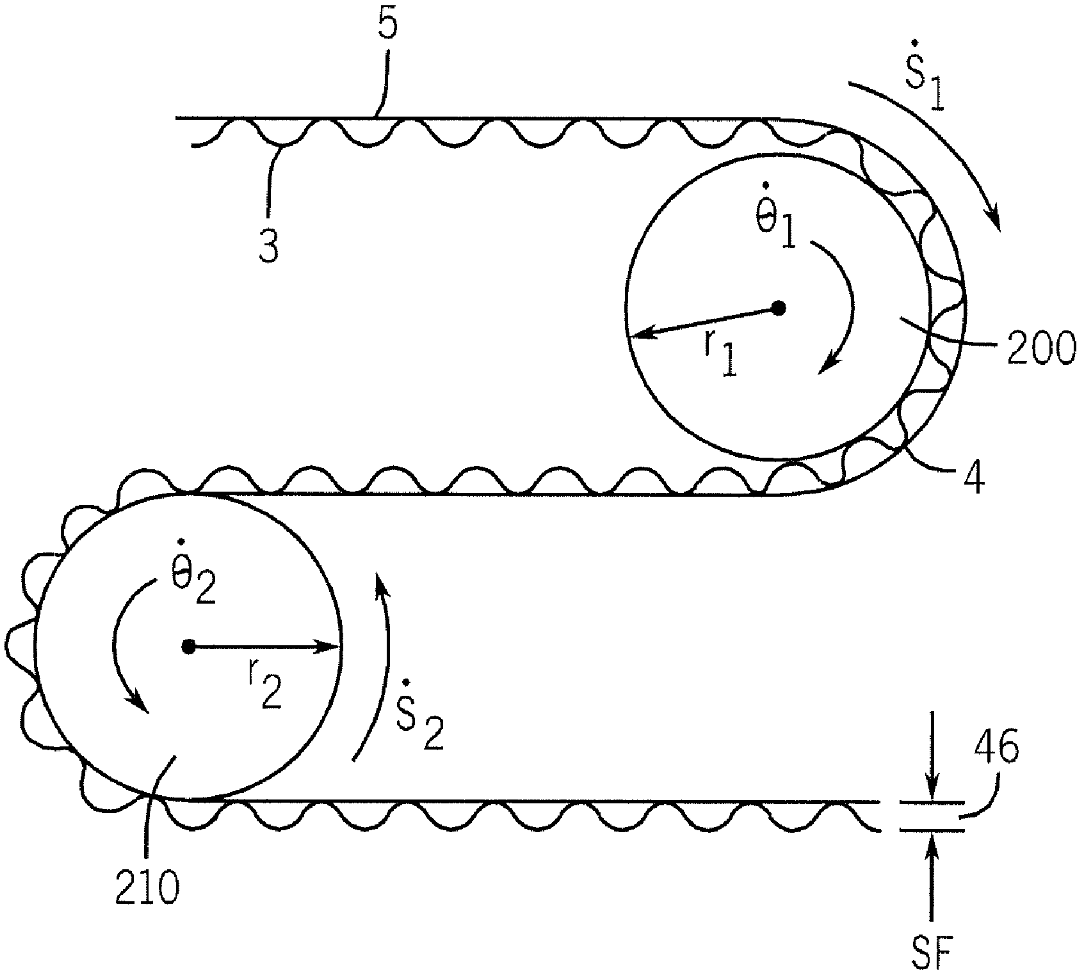
FIG. 7 is a schematic representation of a means of wrapping singleface web around two idler rolls to allow computation of singleface web caliper.

The control system schematic describing the automatic gap control system of the present invention is shown in FIG. 4. According to the tenants of the present invention, an initial gap command $g_c$ (120) for the rider roll to glue applicator roll gap is selected. This initial gap command $g_c$ (120) can be either entered manually into the system through the glue machine touch screen display (not shown) or derived by the glue machine controller from appropriate configuration values normally based upon the flute type being run. The initial gap command can also be determined by measuring the caliper of the singleface web upstream of the glue machine by any of various known means. One new means of measuring the single face web caliper is shown in FIG. 7 and will be discussed below. Normally, the initial gap setting is selected at start-up of the machine or at the time of a flute change. There are some circumstances where this initial gap selection should be changed during normal run as will be described in ensuing paragraphs. During start-up, while the corrugator is accelerating to cruise speed, the auto glue gap system is inhibited from working by opening software latch $L_1$ (110). The initialization gap command $g_c$ (120) is activated by closing software latch $L_2$ (115).

Upon reaching a cruise speed as evidenced by exceeding a creep speed and achieving reasonable steady state operation, software Latch $L_1$ (110) closes initiating the auto glue gap control. At this point rider roll jack screw 80 responds to the initial gap command $g_c$ (120), the outer loop of the glue applicator roll drive current feedback $i_f$ (185) and the drive current command $i_c$ (100) to set the gap g (45) (FIG. 2). The actual singleface web 5 with caliper SF progresses through the gap creating a compression c in the web. This compression causes a drag force $F_d$ that depends upon the slope K of the flute tip stress/strain curve, the coefficient of friction between the singleface web flute tips and the adhesive coated glue applicator roll and the compression level c. The drag force $F_d$ acting through the radius of the glue applicator roll 20 creates a forward running torque $\tau_d$. This torque is summed with the glue applicator roll motor torque $\tau_m$ to create the torque $\tau_g$ on the glue applicator roll 20. This torque acts on the inertia of the glue roll and bearing drag load resulting in an output angular velocity $\dot{\theta}$ of the glue roll 20. This output angular velocity is measured against the commanded angular velocity $\dot{\theta}_c$ that is derived from corrugator speed $\dot{S}$ and radius r of the glue applicator roll 20 and the desired corrugator underspeed, e.g. 0.97, for the glue roll. The error signal $\dot{\theta}_\epsilon$ comprised of the difference between the actual glue roll angular velocity $\dot{\theta}$ and the commanded angular velocity $\dot{\theta}_c$ is then acted upon by the glue applicator roll drive 165 to provide an output drive current $i_o$ (105). This drive current is then applied to the applicator roll motor 175 in a feedback loop to null the angular velocity error $\dot{\theta}_\epsilon$.

The drive current $i_o$ (105) is used in the outer loop of the automatic glue gap control as input to the filter, gain and latch 180. The filter is designed to eliminate noise in the feedback loop as well as any short term fluctuation in the current signal as the singleface web caliper is constant except at paper change. The gain is chosen to provide a stable rider roll gap solution. The latch is logic based software that opens latch $L_1$ (110) during rapid acceleration periods of corrugator operation and opens latch $L_2$ (115) if the corrugator is momentarily stopped for purposes of clearing a dry end jam-up, for example. During stops of this type, wet end papers do not change so there is no reason to act upon gap commands or current feedback signals.

Figure 5:
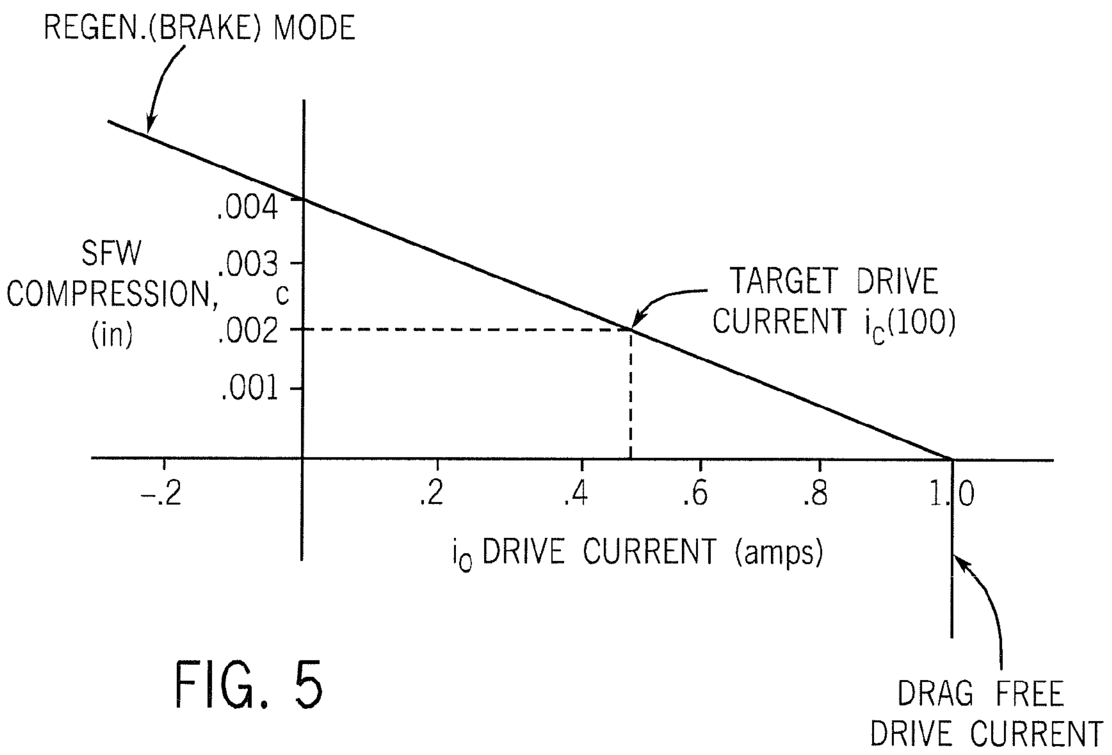
FIG. 5 is a typical curve showing the empirical relationship between the singleface web compression and the glue applicator roll drive current.

During normal corrugator operation, the latches are closed and the filtered drive current feedback $i_f$ (185) is compared to the command set point drive current $i_c$ (100). A plot of typical output drive current $i_o$ (105) versus singleface web compression c is shown in FIG. 5. This curve is empirically derived. It shows output drive current $i_o$ (105) at some constant level when the rider roll 40 is opened up to the point where there is no compression of the singleface web between the rider roll and the glue applicator roll 20. As the rider roll is lowered, causing compression of the flutes 3 of the singleface web 5, the forward running drag force $F_d$ causes the output drive current $i_o$ (105) required to maintain the commanded rotational velocity of the glue applicator roll $\dot{\theta}_c$ to decrease. As compression c further increases, the output drive current $i_o$ (105) decreases until it turns negative or goes into a regenerative (brake) mode of operation.

Using empirical data of this type, it is possible to select a target commanded drive current $i_c$ (100) that will result in a desired small compression c of the singleface web. This commanded current setting $i_c$ (100) combined with the outer loop glue applicator roll feedback current $i_f$, (185) as shown in the FIG. 4 control schematic, is modified by an appropriate conversion gain 125, causing the rider roll jack screw position to be adjusted to hit a desired small compression of the singleface web that is the goal of the present invention.

Figure 6:
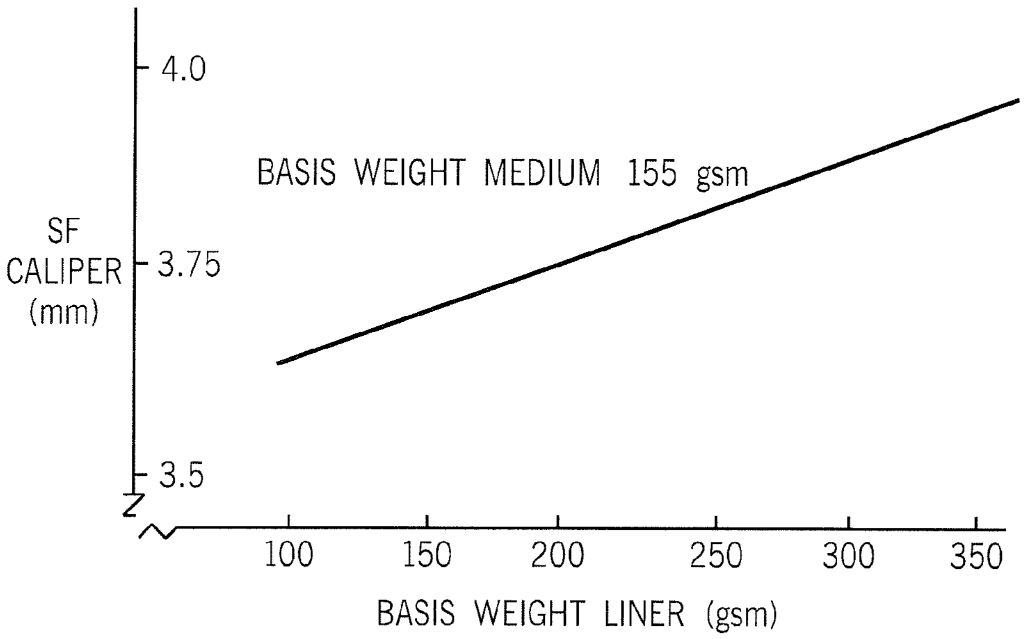
FIG. 6 is a plot showing paper caliper as a function of paper basis weight.

A plot showing paper basis weight versus singleface web caliper is shown in FIG. 6. From the data, it is clear that singleface web caliper can vary as much as 0.5 mm (0.020 inch) due to variation in liner basis weight alone. Taking into consideration the range of mediums that can be run, total singleface web caliper can change by as much as 0.7 mm (0.028 inch) as papers are spliced in at the wet end of the corrugator. Studies have shown that compression of 0.20 mm (0.008 inch) can cause permanent damage to the flute tips when running C-flute corrugated board. In certain corrugated container environments, as many as 80-100 paper changes can be made in an eight-hour shift. This analysis makes it clear why automatic gap control for the rider roll is an important aspect of corrugator operation. Without automatic adaptation of the rider roll to caliper changes, there is strong possibility that the operator would either forget to make a gap adjustment or make an error in setting the gap manually. Either problem could cause the production of board that would be unacceptable and subject to costly return.

The automatic rider roll gap control of the present invention works well to adapt the gap setting to a corrected level in less than one second as a splice enters the glue machine with a change in singleface web caliper. Although uncommon, it is possible that a splice could be made during a period where the corrugator is accelerating. During corrugator accelerations, according to the present invention, the filter, gain and latch 180 of FIG. 4 will cause latches $L_1$ (110) and $L_2$ (115) to open. This is done to prevent the rider roll screw jack from responding to glue applicator roll drive output required to accelerate the roll. Normally this does not present a problem. However, if a splice is made when the corrugator is accelerating, it would be preferable to anticipate this and adapt the rider roll gap to the new required gap setting as soon as the splice enters the glue machine. This can be done by sensing the singleface web caliper upstream of the glue machine and commanding the rider roll to go to this opening less a desired compression level. Command $g_c$ (120) is used to accomplish this objective by closing latch $L_2$ (115) and setting the initial gap $g_c$ (120) to the desired new level in synchronization with the nominal time of the splice entering the glue machine.

A simple means of measuring singleface web caliper is schematically depicted in FIG. 7. In this schematic, singleface web 5 is wrapped around idler roller 200 with flutes 3 facing the roller. The singleface web is then reversed and wrapped around idler roller 210 with liner 4 facing the roller. The velocity $\dot{S}_1$ the singleface web 5 on the top liner side entering idler roller 200 is the same as the top liner velocity $\dot{S}_2$ exiting idler roller 210 or slack would develop. With $\dot{S}_1=\dot{S}_2$ and using the relationship $\dot{S}=r\dot{\theta}$ where r is the effective radius of the rotating system and $\dot{\theta}$ is the angular velocity of the rotating system, one can obtain the relationship $(SF+r_1)\times\dot{\theta}_1=r_2\times\dot{\theta}_2$. The singleface web caliper SF can then be estimated as $SF=(r_2\dot{\theta}_2-r_1\dot{\theta})/\dot{\theta}_1$. If the radius of the rollers are identical, then this relationship is simplified to the form $SF=r\times(\dot{\theta}_2-\dot{\theta}_1)/\dot{\theta}_1$. So, it is possible to simply obtain an estimate of the singleface web caliper SF prior to the glue machine using output of tachometers that measure the rotational velocity of two idler rollers while knowing the radius of these rollers. A splice signal can be provided to the filter, gain and latch 180 in FIG. 4 and the nominal gap command $g_c$ (120) set equal to the measured singleface web SF less the desired compression c. When the corrugator reaches a quiescent state, latch $L_1$ (110) in FIG. 4 closes and error in the gap setting is corrected in the feedback control loop using drive current $i_c$ setting.

It should be noted that the means of estimating singleface web caliper of the present invention as shown in FIG. 7 and as described above is similar to that previously disclosed in FIG. 10 of Patent Application Publication US2008/0317940 A1. However, the method for measuring the singleface web of the present invention has many advantages and benefits over the method disclosed in the prior art that make it unique and different. In the prior art method, the idler roll 184 shown in FIG. 10 of US2008/0317940 A1 must come into close enough content with the open flutes of the singleface web to cause the idler roller to spin up to the speed of the flute tips. But, as shown in FIG. 4 of the reference publication, the idler roll coming into contact with the flute tips causes them to deform. This deformation of flute tips will cause the idler roll 184 to rotate at some speed such that a solution for singleface web, as disclosed in the prior art publication, will be significantly in error. This problem is solved as shown in FIG. 7 of the present invention by wrapping the singleface web at least 180° around the idler roll 200 such that hoop stress associated with any incoming and outgoing web tension will be shared over a large number of flute tips. The radius of idler roll 200 can be chosen large enough so that the substantial number of flute tips would reduce any flute tip deformation to be inconsequential. This is not possible with the teaching of the prior art publication. Another problem with the prior art publication is that idler roll 184 of FIG. 10 of US 2008/0317940 A1 must be precisely controlled to come into contact with the flute tips. The problem of how close to bring idler roll 184 to roller 182 is intractable, because the purpose of bringing the rollers together is to measure that which is required to precisely position idler roller 184, namely the nominal flute height. This problem is resolved by the method of the present invention as the relative locations of the idler roll 200 and idler roll 210 is irrelevant to the solution for the singleface web caliper. Yet another problem of the prior art invention is that roller 184 total indicated run out will cause an oscillation in the solution for singleface web caliper. This problem is mitigated by the current invention as the significant wrap of the web around the two idler rollers will provide an automatic averaging affect. So, although the mathematics used to compute singleface web caliper of the prior art and present invention are similar, the significant advantages and benefits as well as the fact that the rollers do not have to be precisely controlled one to the other make the present invention singular and a significant deviation from the prior art.

What is claimed is:

1. A method for applying starch adhesive to the flute tips of a singleface web having a fluted medium web bonded to a top liner web in a corrugating process, wherein the singleface web medium flute tips are susceptible to compressive damage, said method comprising the steps of:

a. driving with a motor a glue applicator roll having a film of adhesive of a desired thickness applied thereon at a target controlled underspeed relative to corrugator speed;

b. running the singleface web at corrugator speed around a rider roll with a rotational axis parallel to the axis of the glue applicator roll;

c. positioning the rider roll so that the periphery of the roll is closely spaced from the glue applicator roll with a gap between the rolls;

d. adjusting the rider roll toward the glue applicator roll to achieve initial contact of the flute tips of the singleface web with the glue applicator roll without substantial compression that would cause permanent flute tip damage;

e. sensing a forward drag the singleface web exerts on the glue applicator roll as the rider roll begins to compress the flute tips of the singleface web against the glue applicator roll by monitoring the effect of the drag on the torque required to maintain the desired underspeed of rotation of the glue applicator roll with torque indicated by the current from the output of a regenerative drive for the motor rotationally driving the glue applicator roll; and f. further adjusting the rider roll to glue applicator roll gap to achieve a glue applicator roll rotational motor regenerative drive output current that results in a target slight compression of the singleface web between the rider roll and the glue applicator roll that will avoid permanent damage to the flute tips of the singleface web.

2. The method of claim 1, including the step of using a feedback control system to cause the rider roll to glue applicator roll gap to be adjusted to achieve the slight compression of the singleface web flutes and to maintain the glue applicator roll underspeed.

3. The method of claim 2, further including the step of entering a target glue applicator roll drive current command based upon an empirical relationship between the drive current and the singleface web compression to achieve an approximate desired compression of the singleface web.

4. The method of claim 2, further including the step of providing an initial start-up rider roll to glue applicator roll gap command based upon direct operator manual input of the gap and a desired compression of the singleface web.

5. The method of claim 2, further including the step of providing an initial start-up rider roll to glue applicator roll gap command based upon a gap setting selection by operator entry of the flute type of the singleface web being run and a desired compression of the singleface web.

6. The method of claim 2, further including the step of providing an initial start-up rider roll to glue applicator roll gap command based upon a gap setting resulting from direct measurement of the singleface web caliper upstream of the glue machine and a desired compression of the singleface web.

7. The method of claim 6, including the step of obtaining a direct measurement of the singleface web caliper upstream of the glue machine, comprising the steps of:

a. running the singleface web around a first idler roll with an approximately 180° wrap with the flute tips of the singleface web in contact with the roll;

b. subsequently running the singleface web around a second idler roll with an approximately 180° wrap with the top surface of the singleface web in contact with the roll; and, c. using the measurement of the respective angular velocities and radii of the rolls to compute an estimate of the caliper of the singleface web.

8. The method of claim 2, further including the step of providing an acceleration inhibit latch that opens an outer loop of the glue applicator roll drive current feedback system during periods of significant corrugator acceleration and providing a gap command latch that opens to cause the gap to be maintained at its current position during periods of significant corrugator acceleration when no splice of the web is made and at a corrugator stop.

9. The method of claim 8, further including the step of closing the gap command latch and establishing a rider roll to glue applicator roll gap command based upon an upstream measurement of singleface web caliper and desired singleface web compression when a splice is made and while the corrugator is accelerating so that the acceleration inhibit latch is open; and timing the gap command latch to close coinciding with the approximate time of entry of the splice into the glue machine.

* * * * *